US010145650B1

(12) United States Patent
Terhark

(10) Patent No.: US 10,145,650 B1
(45) Date of Patent: Dec. 4, 2018

(54) VEHICLE MOUNTED INTERIOR HANDGUN HOLSTER

(71) Applicant: Zachariah D. Terhark, Springfield, MO (US)

(72) Inventor: Zachariah D. Terhark, Springfield, MO (US)

( * ) Notice: Subject to any disclaimer, the term of this patent is extended or adjusted under 35 U.S.C. 154(b) by 126 days.

(21) Appl. No.: 15/415,232

(22) Filed: Jan. 25, 2017

Related U.S. Application Data

(60) Provisional application No. 62/286,931, filed on Jan. 25, 2016.

(51) Int. Cl.
B60R 7/00 (2006.01)
F41C 33/04 (2006.01)
B60R 7/14 (2006.01)
B60R 7/06 (2006.01)

(52) U.S. Cl.
CPC ............. F41C 33/045 (2013.01); B60R 7/06 (2013.01); B60R 7/14 (2013.01)

(58) Field of Classification Search
CPC ...... B60R 7/06; B60R 2011/0005–2011/0008; B60R 2011/001
USPC ................................................ 224/483, 572
See application file for complete search history.

(56) References Cited

U.S. PATENT DOCUMENTS

| 410,681 | A | | 9/1889 | Watkins | 280/202 |
|---|---|---|---|---|---|
| 749,865 | A | | 1/1904 | Jarvis | 297/188.09 |
| 1,320,751 | A | | 11/1919 | Freyer | 224/604 |
| 1,430,081 | A | | 9/1922 | Holler | 224/281 |
| 2,037,132 | A | | 4/1936 | Hoyt | 224/623 |
| 2,407,884 | A | | 9/1946 | Johnston | 89/40.04 |
| 2,531,170 | A | | 11/1950 | Tackett | 224/198 |
| 2,553,328 | A | | 5/1951 | Parton | 280/827 |
| 2,655,298 | A | | 10/1953 | Riley | 224/281 |
| 3,762,616 | A | * | 10/1973 | Brunstetter | A45C 11/38 224/237 |
| 3,902,639 | A | * | 9/1975 | Rogers | F41C 33/0227 224/193 |
| 4,410,118 | A | * | 10/1983 | Taurisano | A45F 5/00 224/192 |
| 4,505,411 | A | | 3/1985 | Munn | 224/461 |
| 4,577,787 | A | * | 3/1986 | Hersey | F41C 33/0236 224/192 |
| 4,762,255 | A | | 8/1988 | Dunn | 224/32 R |
| 4,828,154 | A | * | 5/1989 | Clifton, Jr. | A45F 5/14 224/192 |
| 4,923,105 | A | * | 5/1990 | Snyder | A45F 3/14 224/232 |
| 4,984,725 | A | | 1/1991 | Urbom | 224/311 |
| 5,215,238 | A | * | 6/1993 | Baruch | F41A 17/54 224/243 |
| 5,410,762 | A | * | 5/1995 | Maskovich | A45F 5/00 2/312 |
| 5,445,303 | A | * | 8/1995 | Cawile, Jr. | A45F 5/00 224/222 |
| 5,495,969 | A | | 3/1996 | Cardenas | 224/275 |
| 5,865,502 | A | | 2/1999 | Ayers et al. | 297/188.06 |

(Continued)

FOREIGN PATENT DOCUMENTS

GB  2 434 430 A  7/2007  ............. F41C 33/02

Primary Examiner — Brian D Nash
(74) Attorney, Agent, or Firm — Jonathan A. Bay

(57) ABSTRACT

A handgun holster for an automobile interior can be attached to the interior components of a vehicle securely and can be adjusted to fit most vehicle moldings underneath the vehicle's steering wheel.

17 Claims, 15 Drawing Sheets

(56) References Cited

U.S. PATENT DOCUMENTS

| | | | | |
|---|---|---|---|---|
| 6,000,592 | A | 12/1999 | Clanin | 224/413 |
| 6,098,860 | A * | 8/2000 | Phillips | B60N 3/103 |
| | | | | 224/482 |
| 6,338,517 | B1 * | 1/2002 | Canni | B60R 7/04 |
| | | | | 224/281 |
| 6,405,909 | B1 | 6/2002 | Burnett et al. | 224/275 |
| 6,648,193 | B2 * | 11/2003 | Rioux | B60N 3/005 |
| | | | | 108/44 |
| 6,986,446 | B2 | 1/2006 | Murray et al. | 224/275 |
| 8,205,374 | B2 | 6/2012 | Lamm | 42/72 |
| 8,752,745 | B2 | 6/2014 | Bond et al. | 224/413 |
| 8,967,315 | B1 | 3/2015 | Lescallett | 180/219 |
| 9,010,600 | B1 | 4/2015 | Gleaton et al. | B60R 7/06 |
| 9,027,811 | B1 * | 5/2015 | Cannon | F41C 33/041 |
| | | | | 224/192 |
| D734,706 | S | 7/2015 | Gleaton et al. | D12/415 |
| 9,340,164 | B2 | 5/2016 | Pickett | B60R 7/14 |
| 2003/0094470 | A1 * | 5/2003 | Cragg | A45F 5/021 |
| | | | | 224/236 |
| 2003/0141328 | A1 * | 7/2003 | Cragg | A45F 5/021 |
| | | | | 224/192 |
| 2003/0218035 | A1 * | 11/2003 | Willows | A45F 3/16 |
| | | | | 224/148.4 |
| 2004/0252493 | A1 | 12/2004 | Sheffield | 362/190 |
| 2006/0011676 | A1 * | 1/2006 | Willows | A45F 3/14 |
| | | | | 224/148.4 |
| 2006/0213942 | A1 | 9/2006 | Gomez et al. | 224/532 |
| 2010/0102096 | A1 * | 4/2010 | Willows | A45F 3/14 |
| | | | | 224/148.1 |
| 2010/0176167 | A1 | 7/2010 | Hudspeth | 224/275 |
| 2011/0132951 | A1 * | 6/2011 | Vennemeyer | F41C 33/041 |
| | | | | 224/660 |
| 2014/0008405 | A1 * | 1/2014 | Beaver | B60R 11/0241 |
| | | | | 224/276 |
| 2014/0158730 | A1 * | 6/2014 | McDonnell | B60R 7/14 |
| | | | | 224/539 |
| 2014/0166712 | A1 * | 6/2014 | Pickett | B60R 7/14 |
| | | | | 224/483 |
| 2016/0047166 | A1 * | 2/2016 | Payne | E06C 7/14 |
| | | | | 248/205.2 |

* cited by examiner

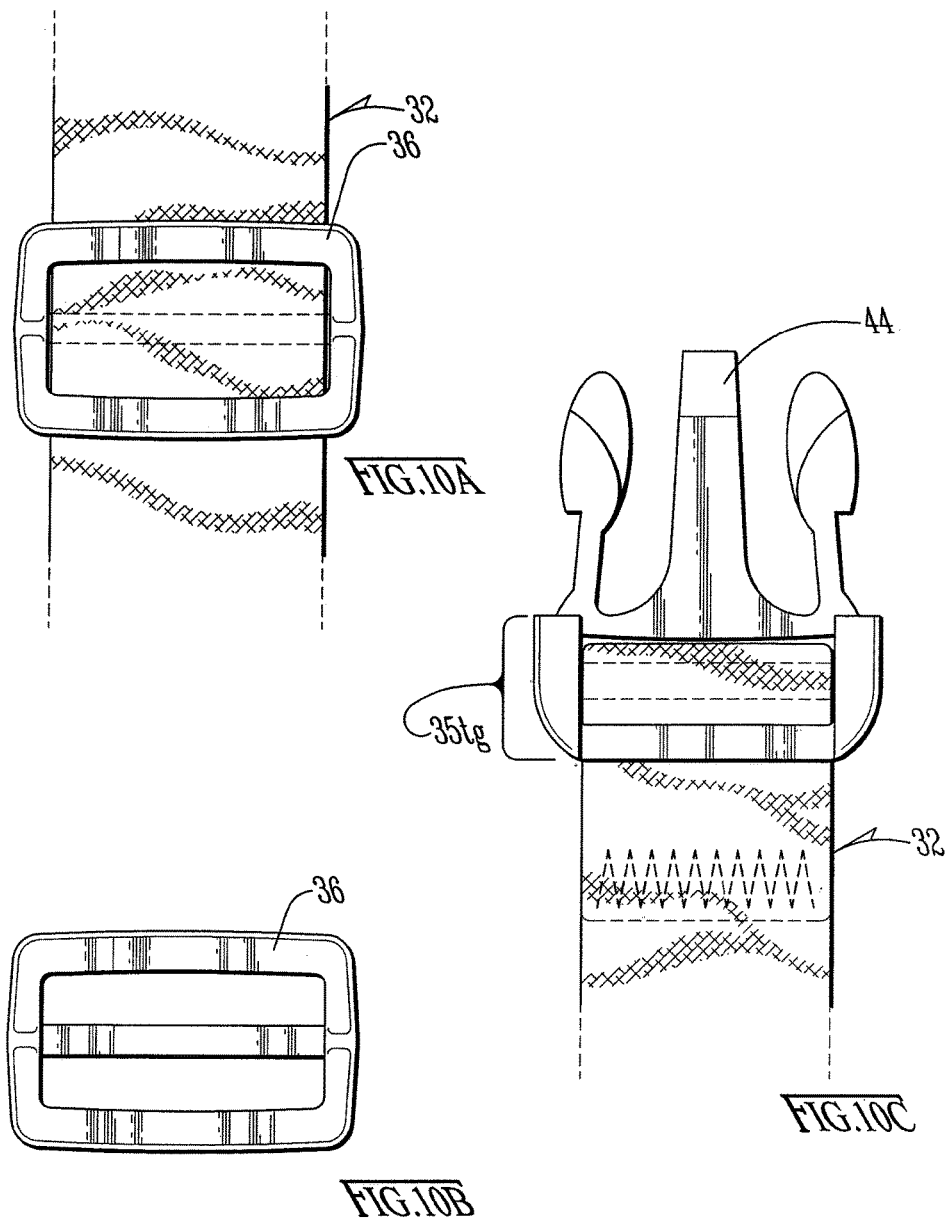

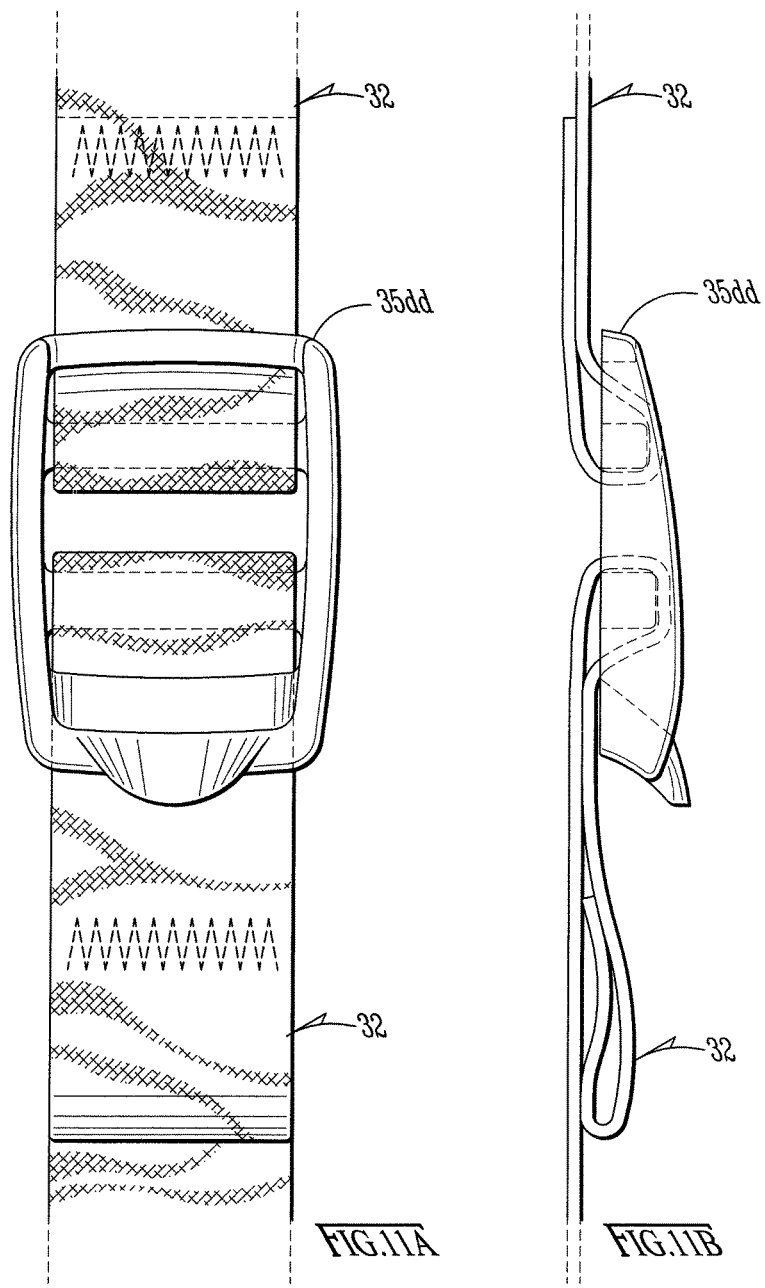

VEHICLE MOUNTED INTERIOR HANDGUN HOLSTER

CROSS-REFERENCE TO PROVISIONAL APPLICATION(S)

This application claims the benefit of U.S. Provisional Application No. 62/286,931, filed Jan. 25, 2016, the disclosure of which is incorporated herein by this reference thereto.

BACKGROUND OF THE INVENTION

1. Field of the Invention

The invention relates to article carriers and, more particularly, to those mounted to a vehicle by flaccid securing means.

It is an object of the invention to improve on secure handgun storage in the interior of a motor vehicle's cabin.

2. Description of the Related Art

Nowadays, the conventional options for storing a handgun inside of a vehicle often are not universal for fitting the design features of a broad spectrum of motor vehicles, often impede accessibility of the handgun and often impede the comfort of the operator of the vehicle.

Conventional handgun vehicle storage options include the following. Handguns are often stored in a glove box or another compartment of the vehicle. However, this method of storage does not allow the operator of the vehicle immediate access to the handgun. Waist belt holsters are not easily worn when operating a motor vehicle and are difficult to draw a weapon from when seated.

U.S. Pat. No. 9,010,600 of Gleaton et al. and U.S. Pat. No. 9,340,164 of Picket are alike in showing dashboard holsters which have a flaccid securing means. That is, these patent disclosures disclose flat webbing systems extending between opposite ends secured to opposite gutter hooks, respectively, and then disclose other features as well.

Each of these patent disclosures rely on at least a lower gutter hook to hook under some portion of dashboard molding. The gutter hooks are typically constructed of bent metal plate comprising a bight portion and a shank portion. The shank portion typically has a stamped rectangular 'eye' (or loop hole) through which the flat webbing strap is threaded.

Some dashboards of compact cars—and even vehicles as large as SUV's with tilt steering wheel columns—have dashboard molding features which are too compact to accommodate a webbing strap with upper and lower hooks that can also thread through the 'holster loop provision' to carry the holster.

Brief pause can be taken here, to consider more particularly what is meant by 'holster loop provision.' A single holster loop can be likened to a single belt loop on a pair of pants. With belt loops, a belt threads through the passage between the belt loop and the waist of the pants. The pants are carried in part from falling off the wearer by the belt loops hanging from the belt. Ordinarily, pants will have a plurality (multiplicity) of belt loops at spaced locations around the waist of the pants. The pants rely on the plurality (multiplicity) of belt loops altogether for support, rather than a single belt loop. Let's call the plurality (multiplicity) of belt loops the 'belt loop provision' for the pants.

Similarly, a holster can be strapped to a waist belt. All the holster needs is a 'holster loop provision.' The waist belt is threaded through the passage(s) between the holster loop provision and the holster, and thus the holster hangs from (is carried on) the waist belt of the wearer.

It is common with conventional holsters to rely on a single—albeit broad—holster loop. In contrast, belt loops are typically narrow. However, a holster loop provision for a holster may alternatively comprise a plurality of individually narrow holster loops.

Given the foregoing, a 'holster loop provision' is the sum of the individual holster loops provided on a given holster that will carry the holster by the threaded belt or strap therethrough. Thus a holster loop provision can vary from a single (probably broad) loop to a plurality of (probably narrow) loops.

To return from the pause above, what was last stated was this. Some dashboards of compact cars—and even vehicles as large as SUV's with tilt steering wheel columns—have dashboard molding features which are too compact to accommodate a webbing strap with upper and lower hooks that can also thread through the 'holster loop provision' to carry the holster.

That is, if an upper hook is hooked through a gap on an upper edge of some feature of dashboard molding, and lower hook under a lower edge, the remaining gap between the eyes of the hooks for the webbing is too miniature of a gap to accommodate the requirements to thread through the 'holster loop provision' of the holster, let alone further accommodate other webbing tackle like buckles, triglide slides, tension locks and so on.

What is needed is an improvement over the shortcomings of the prior art.

SUMMARY OF THE INVENTION

It is an object of the invention to improve on secure handgun storage in the interior of a vehicle's cabin.

It is an alternate object of the invention to improve accessibility without impeding driver comfort with an inventive solution for handgun storage in the interior of a motor vehicle's cabin.

It is an additional object of the invention to provide a holster loop provision for a holster that allows the holster to be oriented in at least two different orientations relative the axis of the support webbing (preferably but without limitation in two different orientations that are perpendicular, or nearly so, to each other).

It is a further object of the invention to provide a holster loop provision for a holster that allows the holster to be oriented across a range of different orientations relative the axis of the support webbing (preferably but without limitation between extremes that are perpendicular, or nearly so, to each other).

These and other objects and aspects of the invention comprises a combination of a handgun holster, flat webbing strap and an optional buckle as well as an optional one or more cinch slides (triglide slides) and/or tension locks. Overall, the combination serves to securely mount around a vehicle steering wheel column, or around dashboard molding underneath or surrounding the steering wheel column.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 10A is a plan view of webbing strap tackle consisting of a triglide slide with strap threaded therethrough;

FIG. 10B is a plan view of the triglide slide in isolation;

FIG. 10C is a plan view of webbing strap tackle consisting of a triglide buckle an adjustable tension strap woven in a half-circuit therethrough;

FIG. 11A is a plan view of webbing strap tackle consisting of a ladder lock buckle, which comprises a loop portion merged with a triglide-buckle portion, and showing one strap woven in a half circle in triglide-buckle fashion through the upper end (upper in the view) of the ladder lock buckle and another strap comprising an adjustable tension strap woven in a half circle through the lower end (lower in the view);

FIG. 11B is a side view of FIG. 11A;

DETAILED DESCRIPTION OF THE PREFERRED EMBODIMENTS

FIGS. 1-8 and 12-15 show a combination 20 and 21 respectively of a holster 24 and holster mounting provision 26 and 27 respectively for mounting in the interior of a vehicle 30, preferably a motor vehicle 30 and, more preferably still, inside the cabin of said motor vehicle 30.

Figure 1:
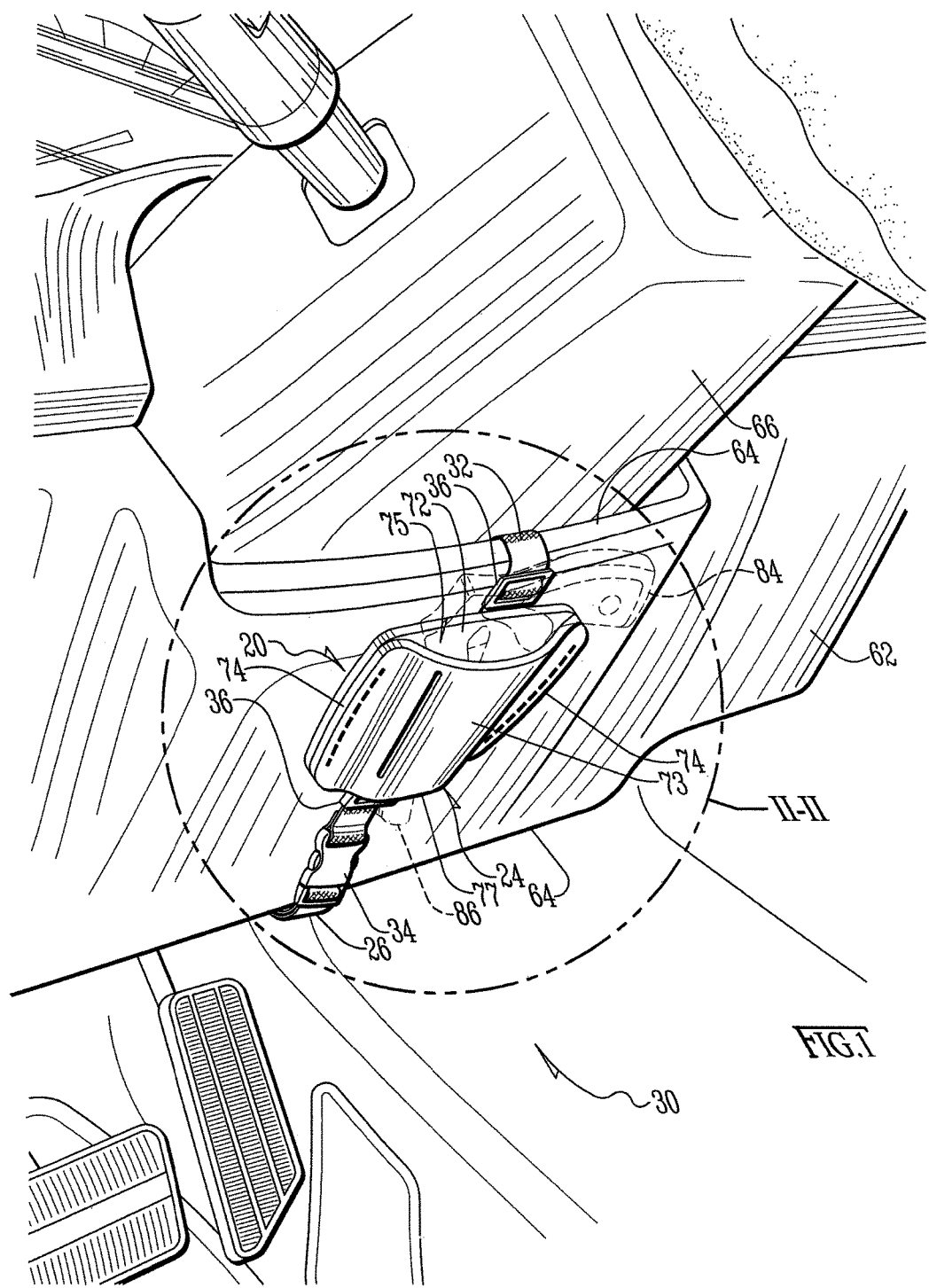
FIG. 1 is a perspective view of a vehicle interior mounted handgun holster in accordance with the invention shown mounted around dashboard molding underneath a steering wheel column.
Figure 2:
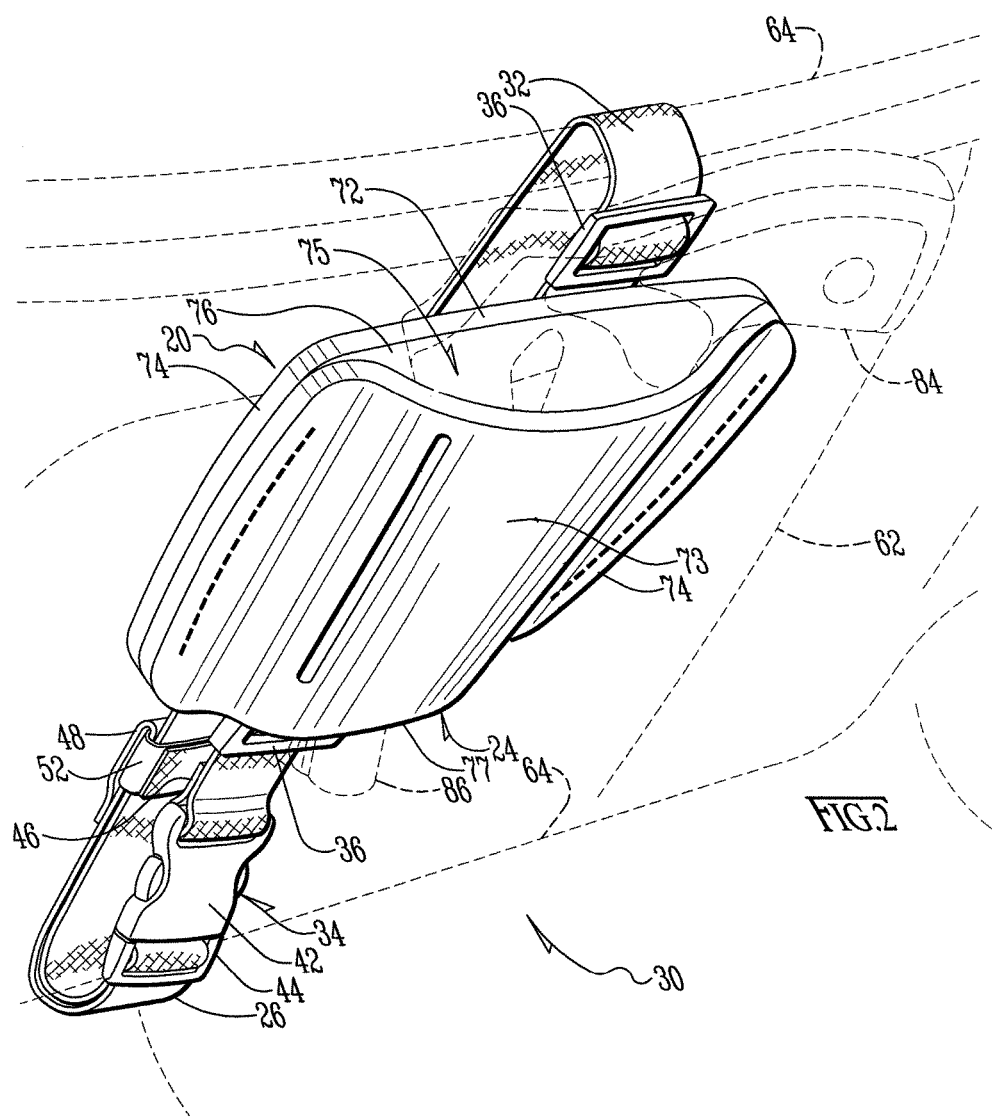
FIG. 2 is an enlarged-scale perspective view of detail II-II in FIG. 1.
Figure 3:
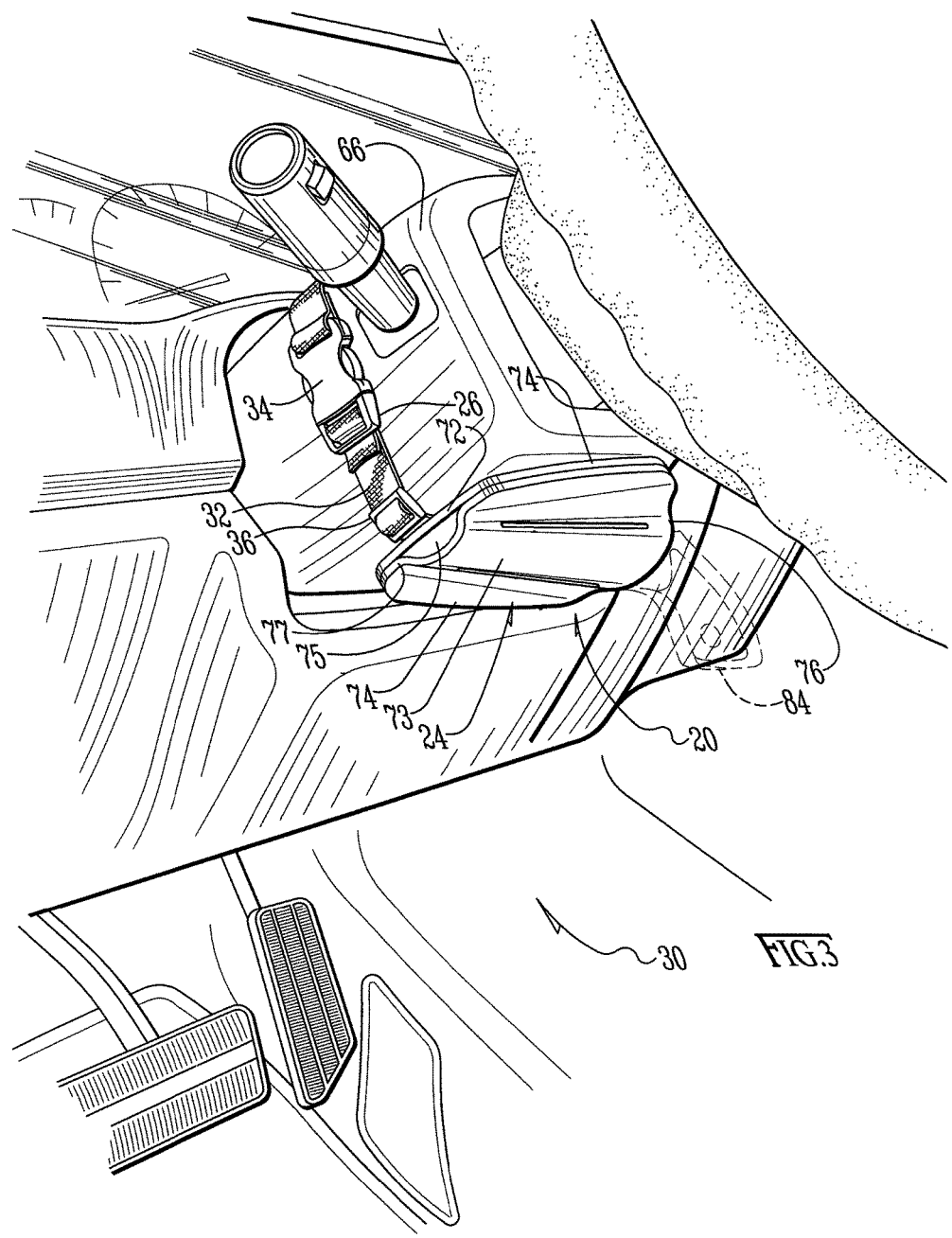
FIG. 3 is a perspective view comparable to FIG. 1 except showing the vehicle interior mounted handgun holster in accordance with the invention mounted around the steering wheel column.
Figure 4:
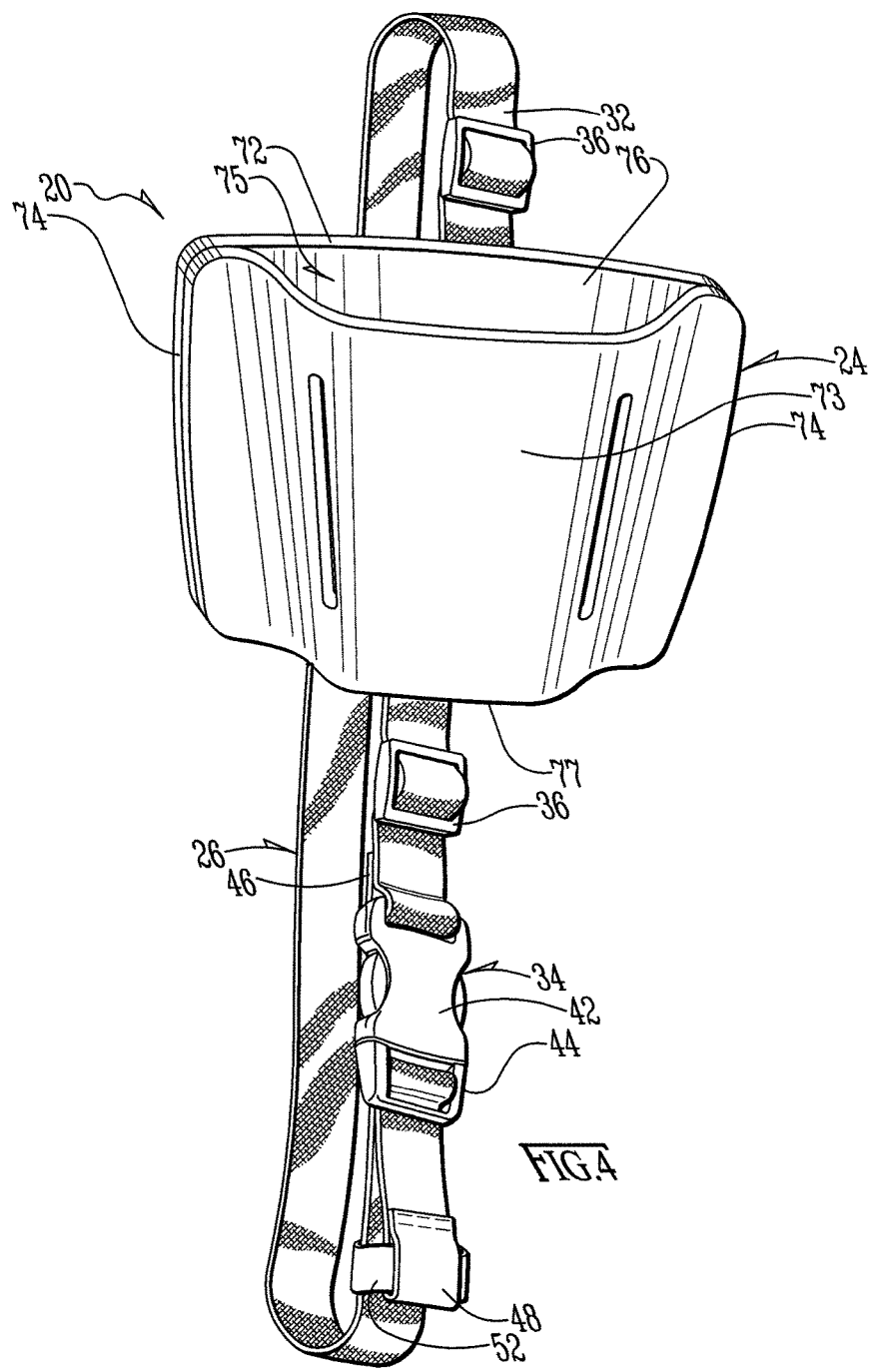
FIG. 4 is almost a directly front elevational view of the vehicle interior mounted handgun holster in accordance with the invention in isolation, except from a vantage point slightly around to the right thereof.
Figure 5:
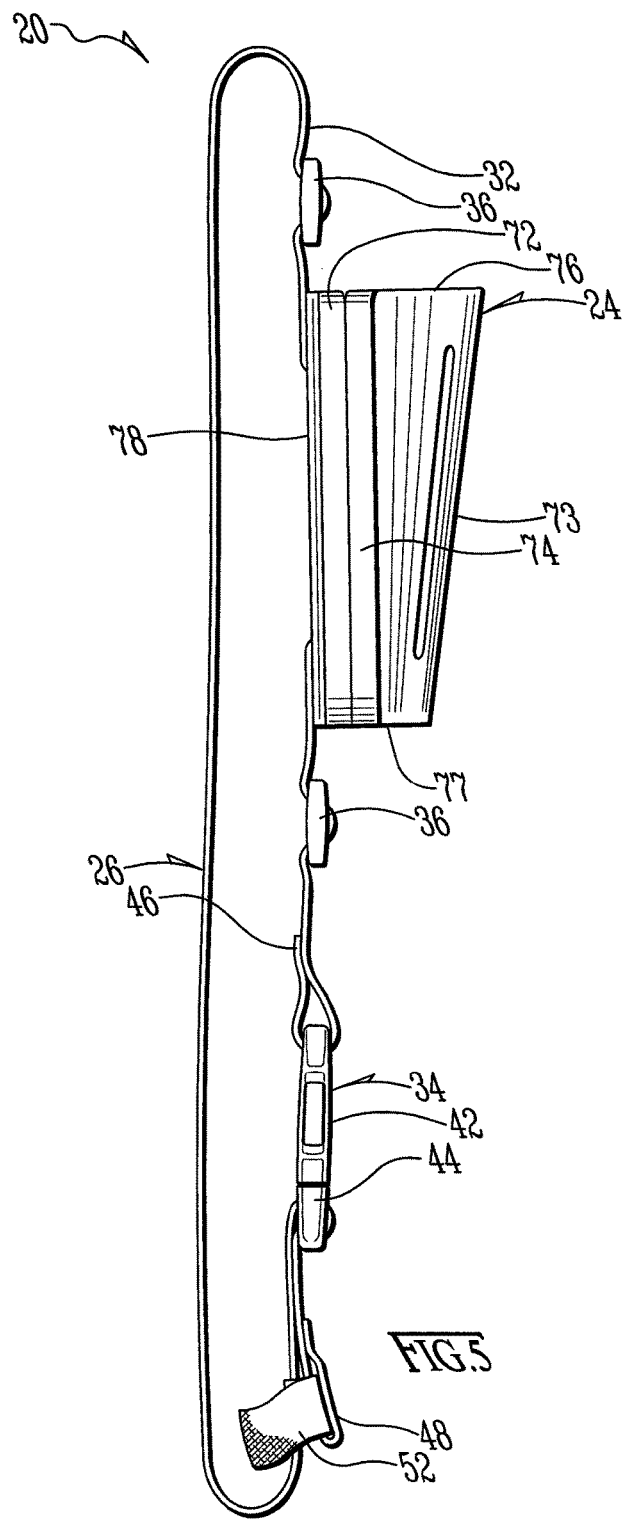
FIG. 5 is a right side elevational view of the vehicle interior mounted handgun holster in accordance with the invention of FIG. 4.
Figure 6:
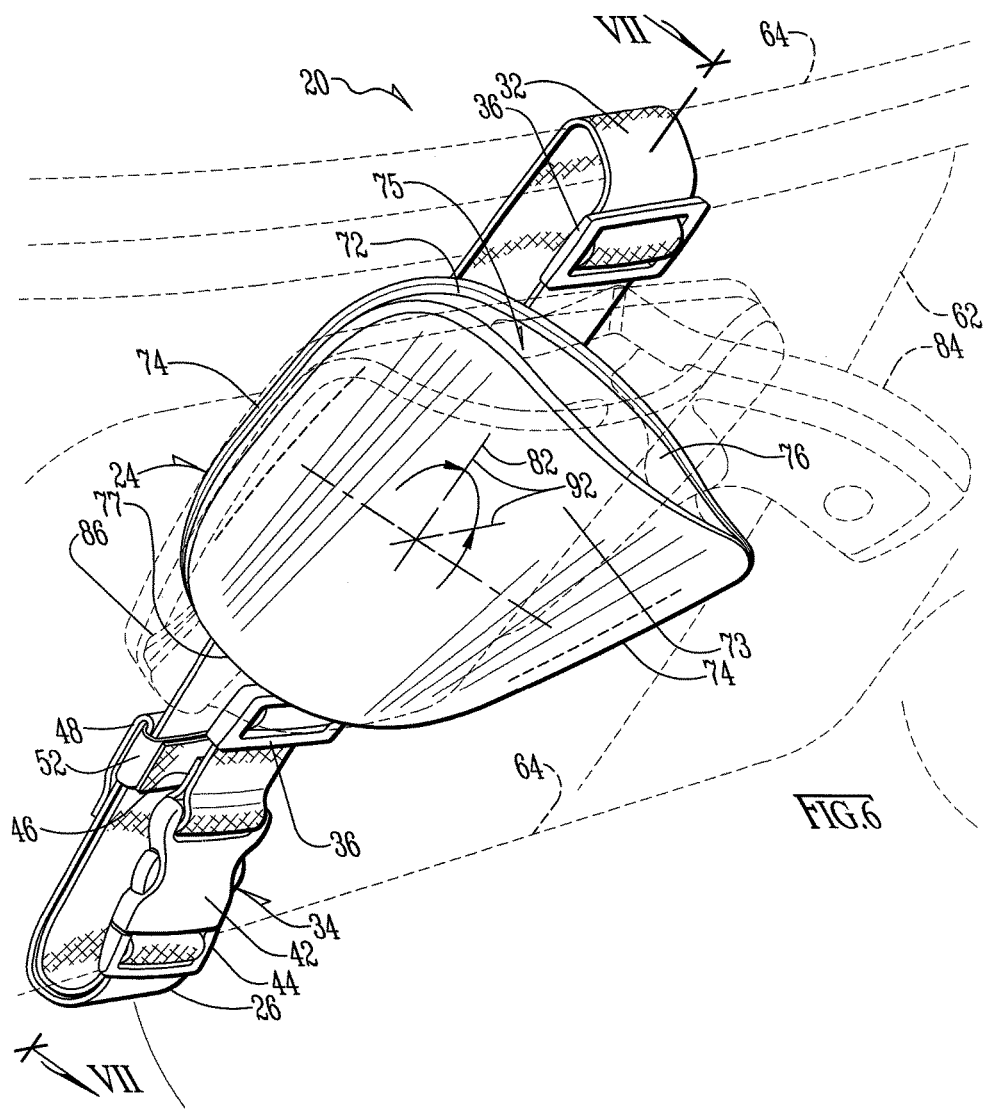
FIG. 6 is a perspective view comparable to FIG. 2 except showing that the holster can held by the webbing strap in various orientations relative the axis of the webbing strap.
Figure 7:
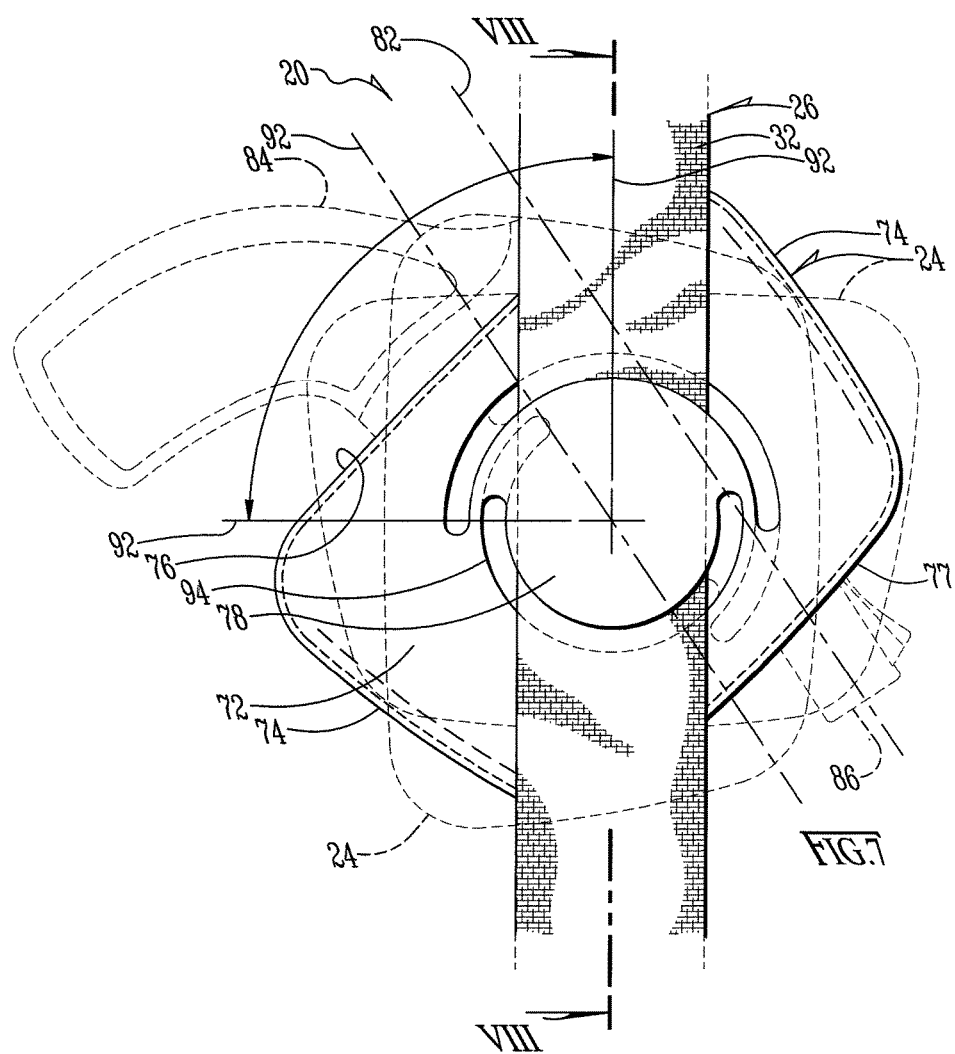
FIG. 7 is a flat planar view taken in the direction of—and in the tilted plane indicated by—arrows in FIG. 6.
Figure 8:
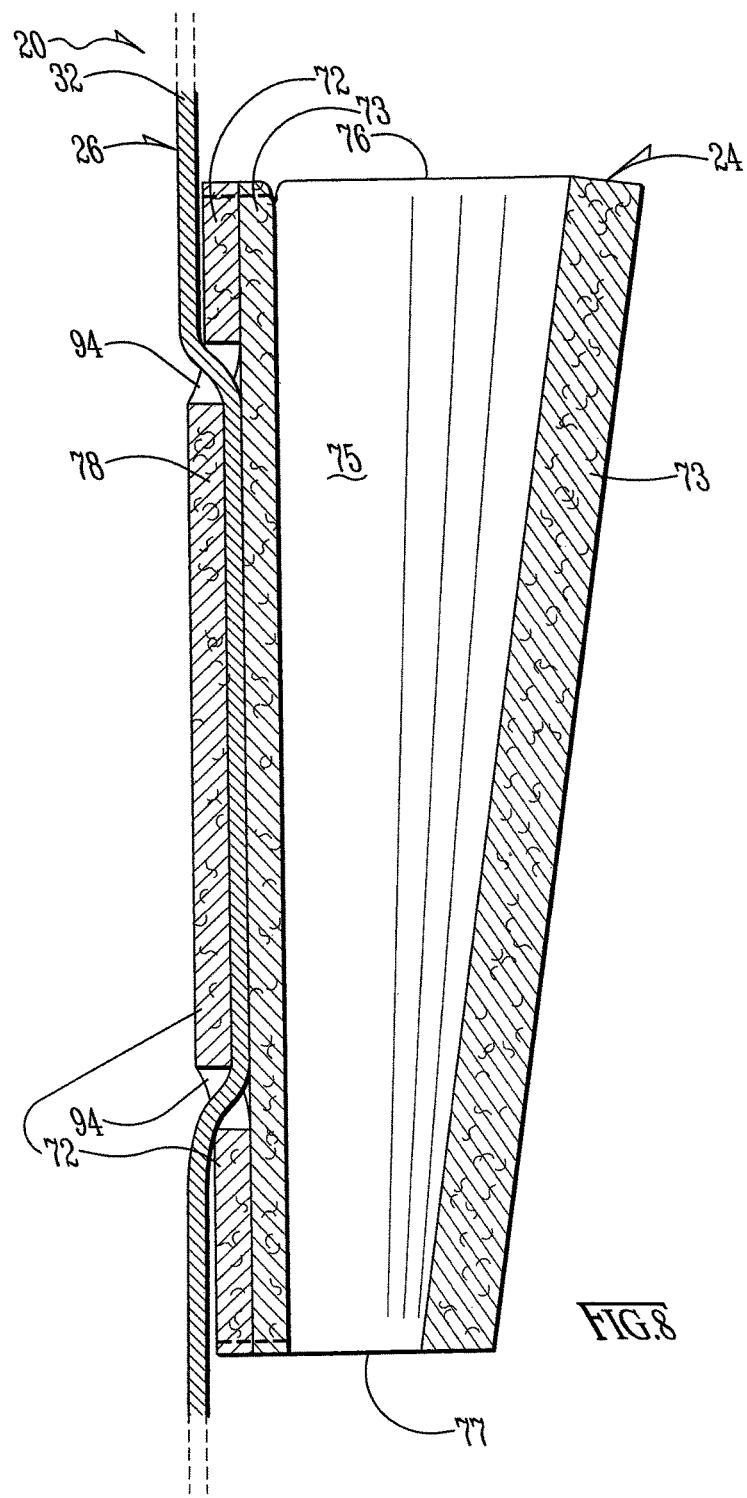
FIG. 8 is a sectional view taken along line VIII-VIII in FIG. 7.

The combination 20 and/or 21 comprises a holster 24, webbing strap 32 for mounting the holster 24 and various pieces of webbing tackle 34-37 including but not limited to a buckle 34-35 and optional other tackle 36-37, such as triglide slides 36 and so on (eg., a pair of triglide slides 36 are shown in FIGS. 4 and 5). The webbing 32 is elongated and extends between a base end 46 attached to a complete buckle 35 or one-half 42 or 44 of a separable buckle 34 or the like.

FIGS. 1-6 and 9B show a quick-release style buckle 34 and, more particularly, a side-release style of quick release buckle 34. These styles of buckles 34 have two interlocking halves 42 and 44. A side-release style of quick release buckle 34 has a female half 42 and a male half 44.

FIGS. 10C, 11A, 11B and 12-15 show complete buckles 35. More particularly, FIGS. 10C and 12-15 show a triglide buckle 35tg and FIGS. 11A and 11B show a ladder lock buckle 35dd.

In FIGS. 1-6 and 9B, the base end 46 of the adjustable tension strap 32 is passed in a half-circle through the loop portion 37' (see FIG. 9B) of the female half 42 of the side-release buckle 34, and sewn for a permanent attachment. The male end 44 would possibly work for this service too, but the male end 44 in the FIGS. 1-6 side release buckle 34 has the triglide buckle portion 35tg' (see FIG. 10C and compare to FIG. 15).

A complete buckle 35 is more like waist-belt buckles (neither waist-belt no buckles therefor are shown) for holding up pants. The tag end of the waist-belt has to be passed through the buckle therefor in order to fasten (again, none of this is shown). Quick release buckles 34 have a complimentary buckle halves (e.g., 42 and 44) for the strap 32, that connect together in a quick-connector fashion.

In FIGS. 1-6, the tag end 48 is provided with a crosswise provision 52 (e.g., a Tee provision 52) of hook-and-pile (e.g., VELCRO®) material to allow independent securing of or tying off the tag end 48 to something to prevent it from flopping around. This allows securing the excess unused portion of the mounting webbing 32 from flopping/swaying around and possibly interfering with the driver's entry into or exit out of the vehicle 30, or otherwise interfering with the driving of the vehicle 30.

The holster 24 defines a handgun-receiving pocket 75, and may be made of genuine leather or any other sufficiently firm and malleable material.

The mounting webbing 32 preferably takes the form of flat strap 32 preferably between about one-half (½) to two (2) inches (12 to 50 mm) wide. The mounting webbing 32 can be made from any number of natural (e.g., cotton) or synthetic materials, the latter which include without limitation polyester, polypropylene, nylon and so on.

The webbing tackle 34-37 can include a numerous multiplicity of optional devices, but the options can be filtered down to the following four (4) broad categories.

Figure 9A:
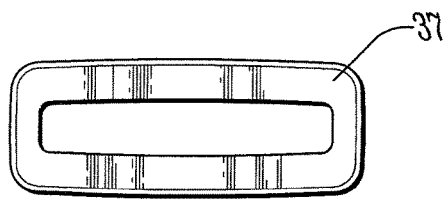
FIG. 9A is a plan view of webbing strap tackle consisting of a loop in isolation.
Figure 9B:
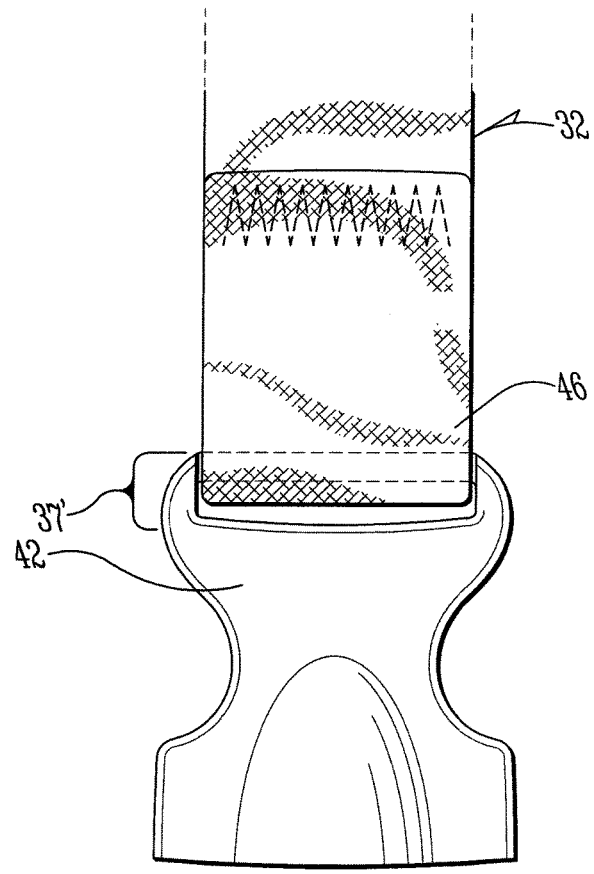
FIG. 9B is a plan view of webbing strap tackle comprising a female half of side-release style quick release buckle, wherein loop portion and the rear end thereof (top end in the view) provides for attachment to a strap.
Figure 12:
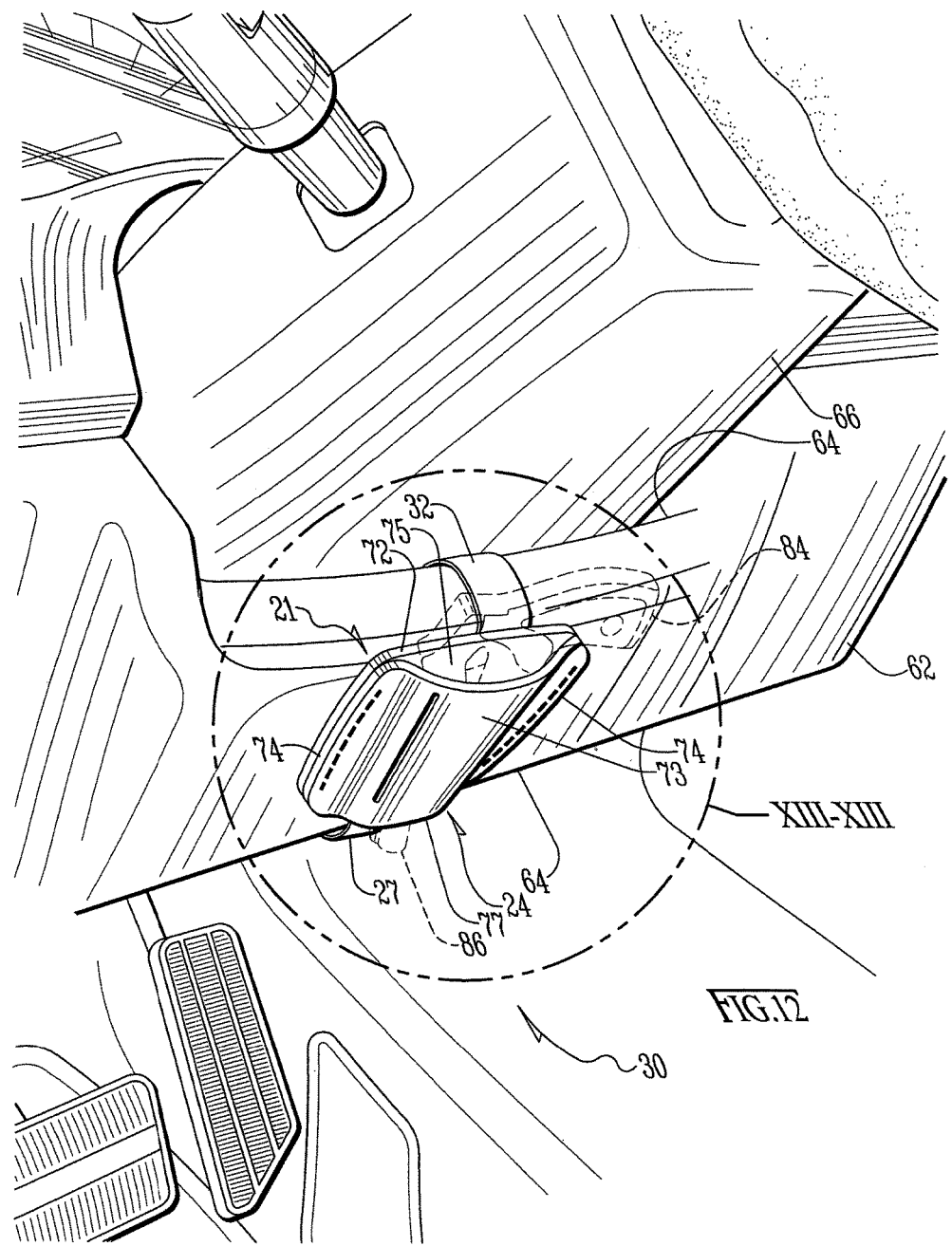
FIG. 12 is a perspective view comparable to FIG. 1 an alternate embodiment of a vehicle interior mounted handgun holster in accordance with the invention shown mounted around dashboard molding underneath a steering wheel column, wherein the dashboard molding shown is here is far more compact (shorter) than in FIG. 1.
Figure 13:
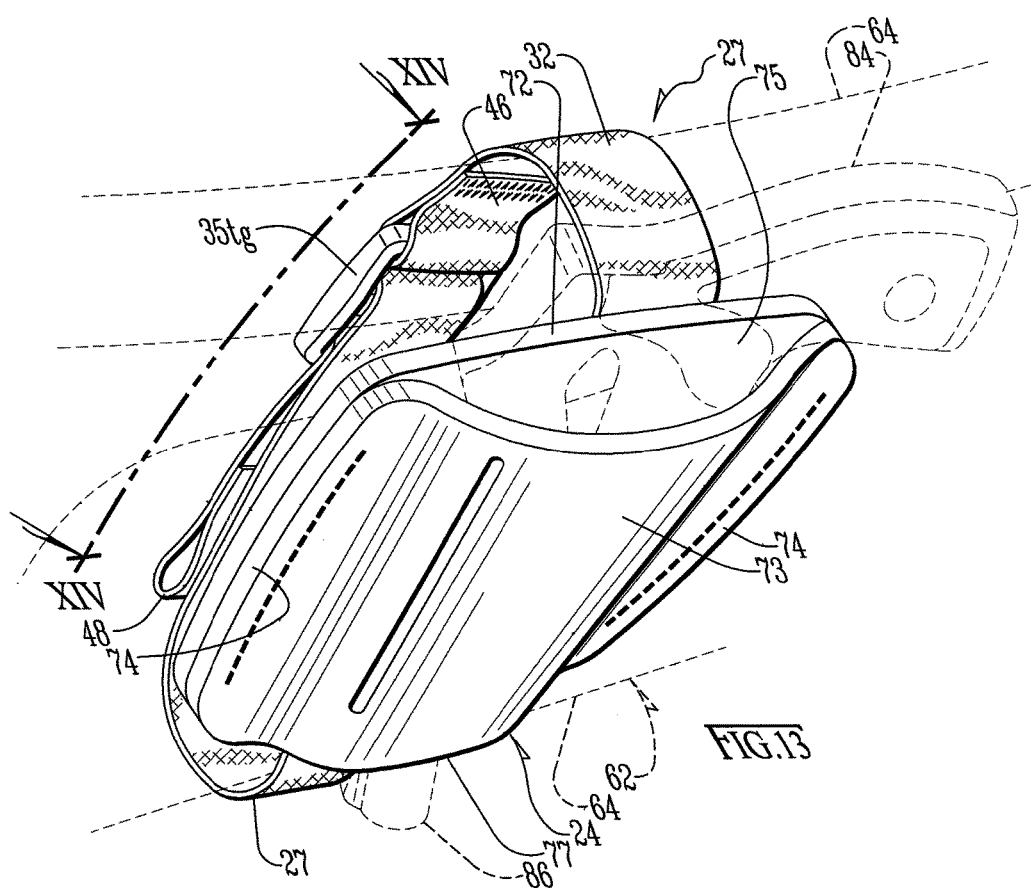
FIG. 13 is an enlarged-scale perspective view of detail XIII-XIII indicated in FIG. 12, wherein the buckle for this embodiment is shown as a triglide buckle (and without limitation)
Figure 14:
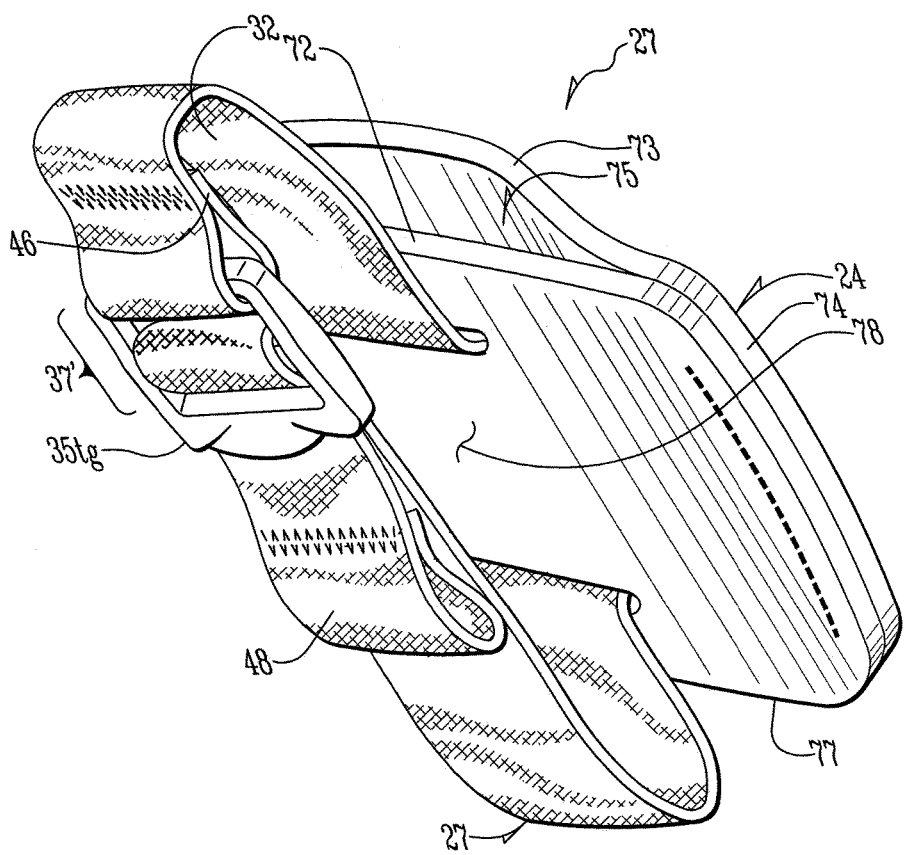
FIG. 14 is a perspective view taken in the direction of arrows XIV-XIV in FIG. 13.

1—Loop 37 (See FIG. 9A).
Loops 37 define a single (1) loophole. The preferred loops 37 for webbing 32 are generally simple rectangular frames defining a single (1) rectangular loophole. Other loops include D-rings and O-rings and other like loop things too (not shown).
Characteristics of a loop 27 preferred for webbing 32 include that:—
it is a rectangular frame and has an overall block figure-0 shape, that is, it has
   2 stiles, and
   2 crossbars, forming
   1 single rectangular loophole.
2—Triglide (e.g., triglide slides 36(see FIGS. 10A and 10B), and, triglide buckles 35tg (see, e.g., FIG. 10C or 15).
  Triglides 35tg and/or 36 define two (2) loopholes. The preferred triglides 35tg and/or 36 for webbing 32 are generally rectangular in overall outline and define two (2) rectangular loopholes. The distinction between triglide slides 36 and triglide buckles 35tg is a little blurred, and there can be some overlap, but this will be discussed more particularly below. With triglide slides 36, there are 'reducers' and other variants as well (not shown).
  Characteristics of a triglide 35tg or 36 preferred for webbing 32 include that:—
   it has a rectangular framework and has an overall block figure-8 shape,
   that is, it has
    2 stiles, and
    3 crossbars, forming
    2 rectangular loopholes.
3—Ladder lock buckle 35dd (See FIGS. 11A and 11B).
  Ladder lock buckles 35dd define three (3) loopholes. The preferred ladder lock buckle 35dd for webbing 32 is generally rectangular in overall outline and defines three (3) rectangular loopholes.
  Characteristics of a ladder lock buckle 35dd preferred for webbing 32
  include that:—
   it has a rectangular framework forming 3-cell framework,
   that is, it has
    2 stiles, and
    4 crossbars, forming
    3 rectangular loopholes.
4—Buckles 34 with articulated or separable parts.
  Buckles 34 with articulated or separable parts come in a wide variety of configurations
  A short list includes:—
   side release buckles 34 (see, e.g., FIGS. 1-6),
   center release buckles (not shown),
   cam-lock lever buckles (not shown),
   double D-rings (not shown), and so on.

As stated above, there are triglide slides 36 (see, e.g., FIG. 10A) and triglide buckles 35tg (see, e.g., FIG. 10C). While the two different devices typically have distinctive features, what distinguishes one from the other is how the webbing 32 is threaded through the two (2) loopholes.

With a triglide slide 36, the webbing 32 extends from a distant origin and enters the nearest (1st) loophole, is run over the central crossbar, pulled through the second (2nd) loophole and then extends on to a distant destination (see, e.g., FIG. 10A).

Figure 15:
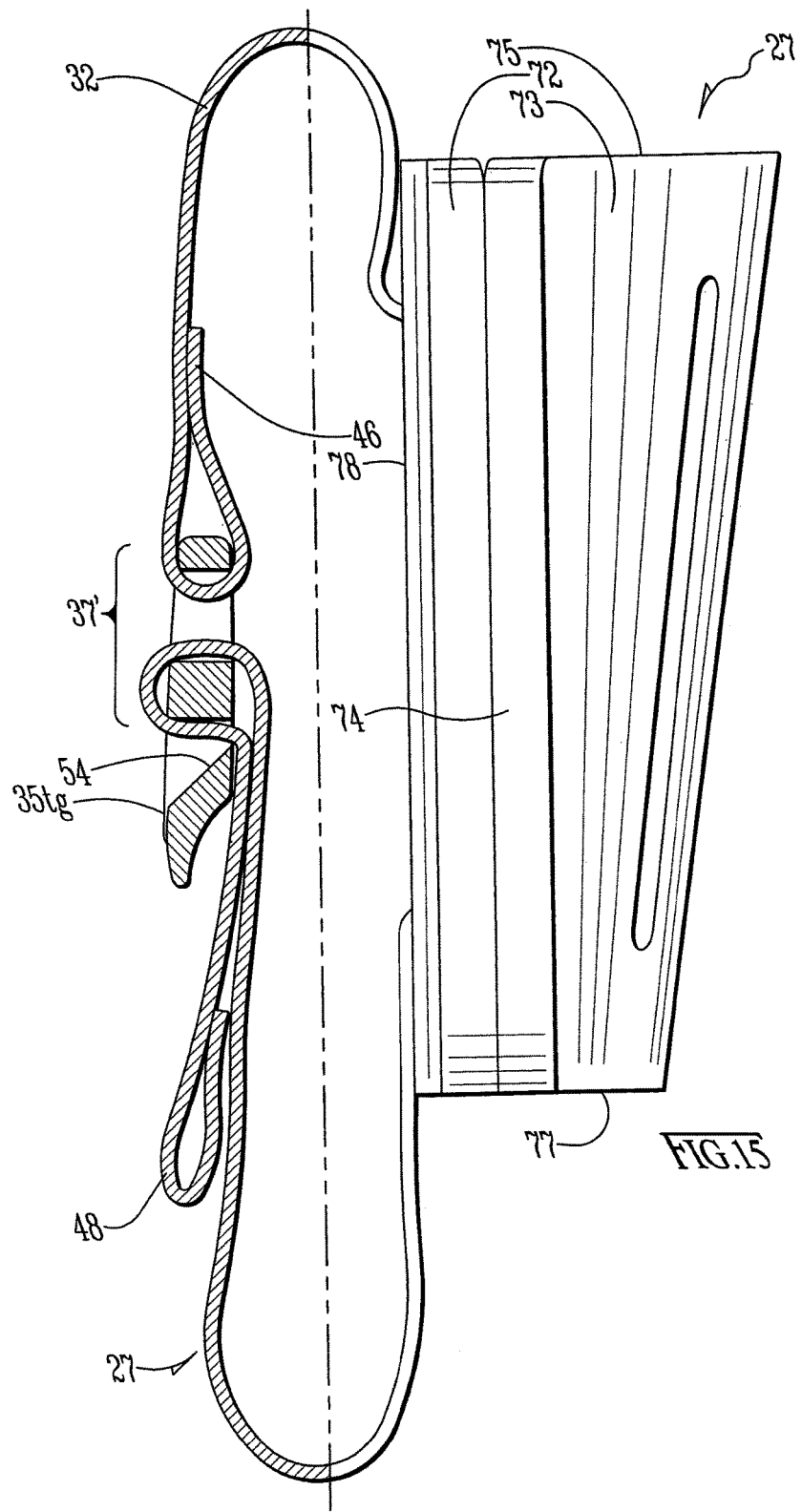
FIG. 15 is a partial sectional view taken along line XV-XV in FIG. 13.

With a triglide buckle 35tg, the webbing 32 extends from a distant origin, passes under the nearest (1st) loophole, enters through the second (2nd) loophole, loops backward over the central crossbar to be pulled through the near (1st) loophole, to lay on top of itself and return to the distant origin (see, e.g., FIG. 10C or 15).

With triglide slides 36, the outer two (2) of the three (3) crossbars are generally mirror opposites and lack provisions to let the webbing 32 do anything other than to pass smoothly, while the central crossbar will be provided with some roughness to prevent webbing slippage.

With triglide buckles 35tg, one of the outer two (2) of the three (3) crossbars is non-involvedand its features are irrelevant (to securing the half circle of strap 32 threaded therethrough). The central crossbar might have teeth. The outer crossbar under which the webbing 32 returns to origin might have teeth or at least a wedge formation 54 (see, e.g., FIG. 15) to bite into the webbing 32, and thus more securely prevent webbing slippage than a triglide slide 36.

In FIGS. 1-5, the triglide slides 36 are used to confine the handgun holster 24 at a given position on the webbing strap 32, to keep the holster 24 from sliding up or down while the strap 32 is attached in the cabin of the vehicle 30. The webbing strap 32 has sufficient length to the tag end 48 to leave excess past the buckle 34 with which the overall length of the circuit of webbing strap 32 beginning at the buckle 34 and ending at the buckle 34 can be increased or decreased, also with which the tension of the circuit of strap 34 can be increased or decreased.

A motor vehicle interior handgun mount 26 in accordance with the invention for a motor vehicle dashboard 62 having a free span 64 of molding 64 extending and spanning horizontally under a steering wheel column 66, preferably comprises the following.

An adjustable tension strap 32 extending between a first end 46 and a spaced away second end 48.

A holster 24 having an inner wall 72 and outer wall 73 meeting at at least two spaced away peripheral edge portions 74 and forming a handgun-holding pocket 75 extending between and open receiving end 76 and a spaced away muzzle end 77.

Said inner wall 72 having a holster loop provision 78 in which the strap 32 is threaded therethrough along an axis 82 (see FIG. 7), the holster loop provision 78 making full or discontinuous contact with the strap 32 along axis 82 (see FIG. 7) between one extreme edge and another extreme, and beyond both extreme edges in both directions the strap 32 is unfettered at least by the holster loop provision 78.

And, a quick release buckle 34 comprising one and another complimentary releasing buckle portions 42 and 44, or vice versa, the one complimentary releasing buckle portion 42 or 44 being attached to the first end 46 of the adjustable strap 32 and the other complimentary releasing buckle portion 44 or 42 being engaged with the strap 32 somewhere between the first and second ends 46 and 48 thereof in an adjustable-tension lock engagement (e.g., in the manner of triglide buckle portion 35tg' and see, e.g., FIGS. 10C and 15).

Wherein the strap 32 is disposed encircled around either the free span 64 of the dashboard molding or the steering wheel column 66 with the one and another complimentary releasing buckle portions 42 and 44 of the quick release buckle 34 buckled together.

And further wherein the other complimentary releasing buckle portion 44 or 42 that engages with the strap 32 somewhere between the first and second ends 46 and 48 thereof might optionally further comprise tackle 34-37 in the form of a triglide buckle portion 35tg', whereby pulling the second end 48 of the strap 32 tight tensions the encircling portion of the strap 32 between the one and another complimentary releasing buckle portions 42 and 44 of the quick release buckle 34.

Said motor vehicle interior handgun mount 26 of might optionally further comprise a triglide slide 36 threaded onto the strap 32 on one side of the holster 24 to confine the holster 24 from sliding past the triglide slide 36.

Said motor vehicle interior handgun mount 26 of might also optionally further comprise another triglide slide 36 threaded onto the strap 32 on the other side of the holster 24 to confine the holster 24 from sliding this other triglide slide 36.

And additionally wherein, said quick release buckle 34 optionally comprises a side-release style quick release buckle 34.

And also wherein, when a handgun 84 having a barrel 86 that has a barrel axis 88 is firmly holstered in the holster 24, the holster 24 optionally carries the handgun 84 on a cant axis 92 that coincident with or parallel to the handgun's barrel axis 88, and, the cant axis 92 is non-parallel to the axis 82 (see FIG. 7) which the strap 32 thread through the holster loop provision 78.

By one option, the cant axis 92 is perpendicular to the axis 82 (see FIG. 7) which the strap 32 thread through the holster loop provision 78.

It is additionally optionally possible that, when a handgun 84 having a barrel 86 that has a barrel axis 88 is firmly holstered in the holster 24, the holster 24 optionally carries the handgun 84 on a cant axis 92 that coincident with or parallel to the handgun's barrel axis 88, and, the holster loop provision 78 further comprises a rotational-adjustability provision such that the cant axis 92 can be rotated relative to the axis 82 (see FIG. 7) which the strap 32 thread through the holster loop provision 78 from parallel to perpendicular.

Given the foregoing, the rotational-adjustability provision of the holster loop provision 78 might optionally comprise the holster loop provision 78 being formed with opposed arcuate slits 94.

According to an alternate embodiment of a motor vehicle interior handgun mount 27 in accordance with the invention for a motor vehicle dashboard 62 having a free span 64 of molding extending and spanning horizontally under a steering wheel column 66, it might comprise the following aspects.

An adjustable tension strap 32 extending between a first end 46 and a spaced away second end 48.

A holster 24 having an inner wall 72 and outer wall 73 meeting at at least two spaced away peripheral edge portions 74 and forming a handgun-holding pocket 75 extending between and open receiving end 76 and a spaced away muzzle end 77.

Said inner wall 72 having a holster loop provision 78 in which the strap 32 is threaded therethrough along an axis 82 (see FIG. 7), the holster loop provision 78 making full or discontinuous contact with the strap 32 along axis 82 (see FIG. 7) between one extreme edge and another extreme, and beyond both extreme edges in both directions the strap 32 is unfettered at least by the holster loop provision 78.

And, a buckle 35 attached to the first end 46 of the adjustable strap 32 for buckling to portions of the strap 32 somewhere between the first and second ends 46 and 48 thereof in an adjustable-tension lock engagement (e.g., in the manner of triglide buckle 35tg and see, e.g., FIG. 15).

Wherein the second end 48 of the strap 32 is fed over and down behind the free span 64 of the dashboard molding to a destination where the buckle 35 can be buckled to the strap 32 somewhere between the first and second ends 46 and 48 thereof in the adjustable-tension lock engagement (e.g., in the manner of triglide buckle 35tg and see, e.g., FIG. 15).

Wherein optionally, the buckle 35 might comprise one of a triglide buckle 35tg or a ladder lock buckle 35dd.

Said motor vehicle interior handgun mount 27 of might optionally further comprise a triglide slide 36 threaded onto the strap 32 in between the first end 46 and holster 24 slid up underneath the holster 24 to support the holster 24 in front of the free span 64 of dashboard molding at a given elevation.

Said motor vehicle interior handgun mount 27 might also optionally further comprise another triglide slide 36 threaded onto the strap 32 in between the holster 24 and the second end 48 and slid down on top of the holster 24 to confine the holster 24 at the given elevation.

It is an aspect of the invention to allow mounting on compact dashboard molding (see, e.g., FIGS. 12-15).

The free span 64 of dashboard molding might only have a usable span along the axis 82 (see FIG. 7) of the holster loop provision 78 which has a length "X" (for example and without limitation, 2½ inches, or ~sixty-four mm). The one and the other extremes of the holster loop provision 78 define along the axis 82 (see FIG. 7) thereof another length "Y" (for example and without limitation, 1½ inches, or ~thirty-eight mm). In such a case, Y is greater than ½X. Furthermore, the lengths X and Y are contained in generally parallel planes that are tilted with respect to vertical.

For a handgun 84 having a barrel 86 that has a barrel axis 88 is firmly holstered in the holster 24, the holster 24 optionally carries the handgun 84 on a cant axis 92 that coincident with or parallel to the handgun's barrel axis 88, and, the cant axis 92 is non-parallel to the axis 82 (see FIG. 7) which the strap 32 thread through the holster loop provision 78.

Alternatively, for a handgun 84 having a barrel 86 that has a barrel axis 88 is firmly holstered in the holster 24, the holster 24 optionally carries the handgun 84 on a cant axis 92 that coincident with or parallel to the handgun's barrel axis 88, and, the holster loop provision 78 further comprises a rotational-adjustability provision such that the cant axis 92 can be rotated relative to the axis 82 (see FIG. 7) which the strap 32 thread through the holster loop provision 78 from parallel to perpendicular. The rotational-adjustability provision of the holster loop provision 78 optionally comprises the holster loop provision 78 being formed with opposed arcuate slits 94.

A further embodiment of a motor vehicle interior handgun mount 26 for a motor vehicle dashboard 62 having a free span 64 of molding extending and spanning horizontally under a steering wheel column 66, might comprise the following.

An adjustable tension strap 32 extending between a first end 46 and a spaced away second end 48.

A holster 24 having an inner wall 72 and outer wall 73 meeting at at least two spaced away peripheral edge portions 74 and forming a handgun-holding pocket 75 extending between and open receiving 76 end and a spaced away muzzle end 77.

Said inner wall 72 having a holster loop provision 78 in which the strap 32 is threaded therethrough along an axis 82 (see FIG. 7), the holster loop provision 78 making full or discontinuous contact with the strap 32 along axis 82 (see FIG. 7) between one extreme edge and another extreme, and beyond both extreme edges in both directions the strap 32 is unfettered at least by the holster loop provision 78.

And, a separable buckle 34 comprising one and another complimentary releasing buckle portions 42 and 44, or vice versa, the one complimentary releasing buckle portion 42 or 44 being attached to the first end 46 of the adjustable strap 32 and the other complimentary releasing buckle portion 44 or 42 being engaged with the strap 32 somewhere between the first and second ends 46 and 48 thereof in an adjustable-tension lock engagement (e.g., in the manner of triglide buckle portion 35tg' and see, e.g., FIGS. 10C and 15).

Wherein the strap 32 is disposed encircled around either the free span 64 of the dashboard molding or the steering wheel column 66 with the one and another complimentary releasing buckle portions 42 and 44 of the separable buckle 34 buckled together.

And further wherein, when a handgun 84 having a barrel 86 that has a barrel axis 88 is firmly holstered in the holster 24, the holster 24 optionally carries the handgun 84 on a cant axis 92 that coincident with or parallel to the handgun's barrel axis 88, and, the cant axis 92 is non-parallel to the axis 82 (see FIG. 7) which the strap 32 thread through the holster loop provision 78.

The holster mount 26 and/or 27 is meant to be mounted in the helm area of the cabin of the vehicle 30, or that is, within reach of the seated driver.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A motor vehicle interior handgun mount for a motor vehicle dashboard having a free span of molding extending and spanning horizontally under a steering wheel column, said motor vehicle interior handgun mount comprising:
   an adjustable tension strap extending between a first end and a spaced away second end;
   a holster having an inner wall and outer wall meeting at at least two spaced away peripheral edge portions and forming a handgun-holding pocket extending between an open receiving end and a spaced away muzzle end;
   said inner wall having a holster loop provision in which the strap is threaded therethrough along an axis, the holster loop provision making full or discontinuous contact with the strap along axis between one extreme edge and another extreme, and beyond both extreme edges in both directions the strap is unfettered at least by the holster loop provision; and
   a quick release buckle comprising one and another complimentary releasing buckle portions, the one complimentary releasing buckle portion being attached to the first end of the adjustable strap and the other complimentary releasing buckle portion being engages with the strap somewhere between the first and second ends thereof in an adjustable-tension lock engagement;
   wherein the strap is encircled around either the free span of the dashboard molding or the steering wheel column with the one and another complimentary releasing buckle portions of the quick release buckle buckled together; and
   wherein the other complimentary releasing buckle portion that engages with the strap somewhere between the first and second ends thereof further comprises tackle in the form of a triglide buckle portion, whereby pulling the second end of the strap tight tensions the encircling portion of the strap between the one and another complimentary releasing buckle portions of the quick release buckle.

2. The motor vehicle interior handgun mount of claim 1, further comprising:
   a triglide slide threaded onto the strap on one side of the holster to confine the holster from sliding past the triglide slide.

3. The motor vehicle interior handgun mount of claim 2, further comprising:
   another triglide slide threaded onto the strap on the other side of the holster to confine the holster from sliding this other triglide slide.

4. A motor vehicle interior handgun mount for a motor vehicle dashboard having a free span of molding extending and spanning horizontally under a steering wheel column said motor vehicle interior handgun mount comprising:
   an adjustable tension strap extending between a first end and a spaced away second end;
   a holster having an inner wall and outer wall meeting at at least two spaced away peripheral edge portions and forming a handgun-holding pocket extending between an open receiving end and a spaced away muzzle end;
   said inner wall having a holster loop provision in which the strap is threaded therethrough along an axis, the holster loop provision making full or discontinuous contact with the strap along axis between one extreme edge and another extreme, and beyond both extreme edges in both directions the strap is unfettered at least by the holster loop provision; and
   a quick release buckle comprising one and another complimentary releasing buckle portions, the one complimentary releasing buckle portion being attached to the first end of the adjustable strap and the other complimentary releasing buckle portion being engages with the strap somewhere between the first and second ends thereof in an adjustable-tension lock engagement;
   wherein the strap is encircled around either the free span of the dashboard molding or the steering wheel column with the one and another complimentary releasing buckle portions of the quick release buckle buckled together; and
   wherein said quick release buckle comprises a side-release style quick release buckle.

5. A motor vehicle interior handgun mount for a motor vehicle dashboard having a free span of molding extending and spanning horizontally under a steering wheel column, said motor vehicle interior handgun mount comprising:
   an adjustable tension strap extending between a first end and a spaced away second end;
   a holster having an inner wall and outer wall meeting at at least two spaced away peripheral edge portions and forming a handgun-holding pocket extending between an open receiving end and a spaced away muzzle end;
   said inner wall having a holster loop provision in which the strap is threaded therethrough along an axis, the holster loop provision making full or discontinuous contact with the strap along axis between one extreme edge and another extreme, and beyond both extreme edges in both directions the strap is unfettered at least by the holster loop provision; and
   a quick release buckle comprising one and another complimentary releasing buckle portions, the one complimentary releasing buckle portion being attached to the first end of the adjustable strap and the other complimentary releasing buckle portion being engages with the strap somewhere between the first and second ends thereof in an adjustable-tension lock engagement;
   wherein the strap is encircled around either the free span of the dashboard molding or the steering wheel column with the one and another complimentary releasing buckle portions of the quick release buckle buckled together; and
   wherein, when a handgun having a barrel that has a barrel axis is firmly holstered in the holster, the holster carries the handgun on a cant axis that coincident with or parallel to the handgun's barrel axis; and the cant axis is non-parallel to the axis which the strap thread through the holster loop provision.

6. The motor vehicle interior handgun mount of claim 5, wherein:

the cant axis is perpendicular to the axis which the strap thread through the holster loop provision.

7. A motor vehicle interior handgun mount for a motor vehicle dashboard having a free span of molding extending and spanning horizontally under a steering wheel column, said motor vehicle interior handgun mount comprising:

an adjustable tension strap extending between a first end and a spaced away second end;

a holster having an inner wall and outer wall meeting at at least two spaced away peripheral edge portions and forming a handgun-holding pocket extending between an open receiving end and a spaced away muzzle end;

said inner wall having a holster loop provision in which the strap is threaded therethrough along an axis, the holster loop provision making full or discontinuous contact with the strap along axis between one extreme edge and another extreme, and beyond both extreme edges in both directions the strap is unfettered at least by the holster loop provision; and a quick release buckle comprising one and another complimentary releasing buckle portions, the one complimentary releasing buckle portion being attached to the first end of the adjustable strap and the other complimentary releasing buckle portion being engages with the strap somewhere between the first and second ends thereof in an adjustable-tension lock engagement;

wherein the strap is encircled around either the free span of the dashboard molding or the steering wheel column with the one and another complimentary releasing buckle portions of the quick release buckle buckled together; and wherein, when a handgun having a barrel that has a barrel axis is firmly holstered in the holster, the holster carries the handgun on a cant axis that coincident with or parallel to the handgun's barrel axis; and the holster loop provision further comprises a rotational-adjustability provision such that the cant axis can be rotated relative to the axis which the strap thread through the holster loop provision from parallel to perpendicular.

8. The motor vehicle interior handgun mount of claim 7, wherein:

the rotational-adjustability provision of the holster loop provision comprises the holster loop provision being formed with opposed arcuate slits.

9. A motor vehicle interior handgun mount for a motor vehicle dashboard having a free span of molding extending and spanning horizontally under a steering wheel column, said motor vehicle interior handgun mount comprising:

an adjustable tension strap extending between a first end and a spaced away second end;

a holster having an inner wall and outer wall meeting at at least two spaced away peripheral edge portions and forming a handgun-holding pocket extending between an open receiving end and a spaced away muzzle end;

said inner wall having a holster loop provision in which the strap is threaded therethrough along an axis, the holster loop provision making full or discontinuous contact with the strap along axis between one extreme edge and another extreme, and beyond both extreme edges in both directions the strap is unfettered at least by the holster loop provision; and a buckle attached to the first end of the adjustable strap for buckling to portions of the strap somewhere between the first and second ends thereof in an adjustable-tension lock engagement;

wherein the second end of the strap is fed over and down behind the free span of the dashboard molding;

wherein the buckle is buckled to the strap somewhere between the first and second ends thereof in the adjustable-tension lock; and wherein the buckle comprises one of a triglide buckle or a ladder lock buckle.

10. The motor vehicle interior handgun mount of claim 9, further comprising:

a triglide slide threaded onto the strap in between the first end and slid up underneath the holster to support the holster in front of the free span of dashboard molding at a given elevation.

11. The motor vehicle interior handgun mount of claim 10, further comprising:

another triglide slide threaded onto the strap in between the holster and the second end and slid down on top of the holster to confine the holster at the given elevation.

12. A motor vehicle interior handgun mount for a motor vehicle dashboard having a free span of molding extending and spanning horizontally under a steering wheel column, said motor vehicle interior handgun mount comprising:

an adjustable tension strap extending between a first end and a spaced away second end;

a holster having an inner wall and outer wall meeting at at least two spaced away peripheral edge portions and forming a handgun-holding pocket extending between an open receiving end and a spaced away muzzle end;

said inner wall having a holster loop provision in which the strap is threaded therethrough along an axis, the holster loop provision making full or discontinuous contact with the strap along axis between one extreme edge and another extreme, and beyond both extreme edges in both directions the strap is unfettered at least by the holster loop provision; and a buckle attached to the first end of the adjustable strap for buckling to portions of the strap somewhere between the first and second ends thereof in an adjustable-tension lock engagement;

wherein the second end of the strap is fed over and down behind the free span of the dashboard molding;

wherein the buckle is buckled to the strap somewhere between the first and second ends thereof in the adjustable-tension lock; and wherein the free span of dashboard molding only has a usable span along the axis of the holster loop provision which has a length "X;"

the one and the other extremes of the holster loop provision define along the axis thereof another length "Y;" and Y is greater than ½X.

13. The motor vehicle interior handgun mount of claim 12, wherein:

when a handgun having a barrel that has a barrel axis is firmly holstered in the holster, the holster carries the handgun on a cant axis that coincident with or parallel to the handgun's barrel axis; and the cant axis is non-parallel to the axis which the strap thread through the holster loop provision.

14. The motor vehicle interior handgun mount of claim 12, wherein:

the lengths X and Y are contained in generally parallel planes that are tilted with respect to vertical.

15. A motor vehicle interior handgun mount for a motor vehicle dashboard having a free span of molding extending and spanning horizontally under a steering wheel column, said motor vehicle interior handgun mount comprising:
- an adjustable tension strap extending between a first end and a spaced away second end;
- a holster having an inner wall and outer wall meeting at at least two spaced away peripheral edge portions and forming a handgun-holding pocket extending between an open receiving end and a spaced away muzzle end;
- said inner wall having a holster loop provision in which the strap is threaded therethrough along an axis, the holster loop provision making full or discontinuous contact with the strap along axis between one extreme edge and another extreme, and beyond both extreme edges in both directions the strap is unfettered at least by the holster loop provision; and
- a buckle attached to the first end of the adjustable strap for buckling to portions of the strap somewhere between the first and second ends thereof in an adjustable-tension lock engagement;
- wherein the second end of the strap is fed over and down behind the free span of the dashboard molding;
- wherein the buckle is buckled to the strap somewhere between the first and second ends thereof in the adjustable-tension lock; and
- wherein, when a handgun having a barrel that has a barrel axis is firmly holstered in the holster, the holster carries the handgun on a cant axis that coincident with or parallel to the handgun's barrel axis; and
- the holster loop provision further comprises a rotational-adjustability provision such that the cant axis can be rotated relative to the axis which the strap thread through the holster loop provision from parallel to perpendicular.

16. The motor vehicle interior handgun mount of claim 15, wherein:
- the rotational-adjustability provision of the holster loop provision comprises the holster loop provision being formed with opposed arcuate slits.

17. A motor vehicle interior handgun mount for a motor vehicle dashboard having a free span of molding extending and spanning horizontally under a steering wheel column, said motor vehicle interior handgun mount comprising:
- an adjustable tension strap extending between a first end and a spaced away second end;
- a holster having an inner wall and outer wall meeting at at least two spaced away peripheral edge portions and forming a handgun-holding pocket extending between an open receiving end and a spaced away muzzle end;
- said inner wall having a holster loop provision in which the strap is threaded therethrough along an axis, the holster loop provision making full or discontinuous contact with the strap along axis between one extreme edge and another extreme, and beyond both extreme edges in both directions the strap is unfettered at least by the holster loop provision; and
- a separable buckle comprising one and another complimentary releasing buckle portions, the one complimentary releasing buckle portion being attached to the first end of the adjustable strap and the other complimentary releasing buckle portion being engages with the strap somewhere between the first and second ends thereof in an adjustable-tension lock engagement;
- wherein the strap is encircled around either the free span of the dashboard molding or the steering wheel column with the one and another complimentary releasing buckle portions of the separable buckle buckled together; and
- wherein, when a handgun having a barrel that has a barrel axis is firmly holstered in the holster, the holster carries the handgun on a cant axis that coincident with or parallel to the handgun's barrel axis; and
- the cant axis is non-parallel to the axis which the strap thread through the holster loop provision.

\* \* \* \* \*